(12) United States Patent
Shelton (10) Patent No.: US 7,324,332 B1
(45) Date of Patent: Jan. 29, 2008

(54) ELECTRICAL ENCLOSURE

(76) Inventor: Brent Shelton, 275 Stiles Rd., Paducah, KY (US) 42003

( * ) Notice: Subject to any disclaimer, the term of this patent is extended or adjusted under 35 U.S.C. 154(b) by 317 days.

(21) Appl. No.: 11/220,264

(22) Filed: Sep. 6, 2005

Related U.S. Application Data (60) Provisional application No. 60/607,470, filed on Sep. 7, 2004.

(51) Int. Cl.
*G01F 1/16* (2006.01)

(52) U.S. Cl. ............ 361/634; 361/625; 361/667; 361/672; 174/50; 174/52.1; 312/223.2; 312/351.11

(58) Field of Classification Search ........ 361/601–606, 361/611–631, 634, 641, 643, 652, 663, 672, 361/658–660; 174/50, 52.1, 37, 38, 45 R, 174/69; 307/112, 113, 47, 143, 147, 150; 312/351.11, 351.12, 351.13, 223.2; 200/51 R; 324/110, 156; 434/365, 379; 248/27.1, 248/129
See application file for complete search history.

(56) References Cited

U.S. PATENT DOCUMENTS

| | | | | |
|---|---|---|---|---|
| 3,341,268 | A * | 9/1967 | Bickford | 312/100 |
| 3,753,047 | A * | 8/1973 | Shallbetter | 361/672 |
| 3,786,312 | A * | 1/1974 | Roussard | 361/643 |
| 4,307,436 | A * | 12/1981 | Eckart et al. | 361/652 |
| 5,784,249 | A * | 7/1998 | Pouliot | 361/622 |
| 6,252,764 | B1 * | 6/2001 | Benson | 361/625 |
| 6,633,479 | B2 * | 10/2003 | Benson | 361/625 |
| 6,657,123 | B2 * | 12/2003 | Moore | 174/50 |
| 6,956,733 | B2 * | 10/2005 | Beasley et al. | 361/641 |

FOREIGN PATENT DOCUMENTS

JP     408308035 A   * 11/1996

\* cited by examiner

*Primary Examiner*—Michael Datskovskiy (57) ABSTRACT

An electrical enclosure is disclosed. The enclosure increases the number of electrical outlets available to a user.

43 Claims, 7 Drawing Sheets

ELECTRICAL ENCLOSURE

FIELD OF THE INVENTION

This application claims priority to U.S. Provisional Patent Application No. 60/607,470, which was filed on Sep. 7, 2004.

FIELD OF THE INVENTION

This invention relates generally to electrical enclosures, and more specifically to an enclosure which increases the number of electrical outlets available to a user.

BACKGROUND OF THE INVENTION

Currently outdoor electrical boxes suffer from a lack of receptacles, plus are difficult to work with during inclement conditions. The present invention provides a means for alleviating this problem.

SUMMARY OF THE INVENTION

It is an object of the present invention to provide a box with numerous electrical outlets that is easy to install and maintain. These and other objects and advantages of the invention will become readily apparent as the following description is read in conjunction with the accompanying drawings.

DETAILED DESCRIPTION OF THE PREFERRED EMBODIMENTS

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

Figure 1:
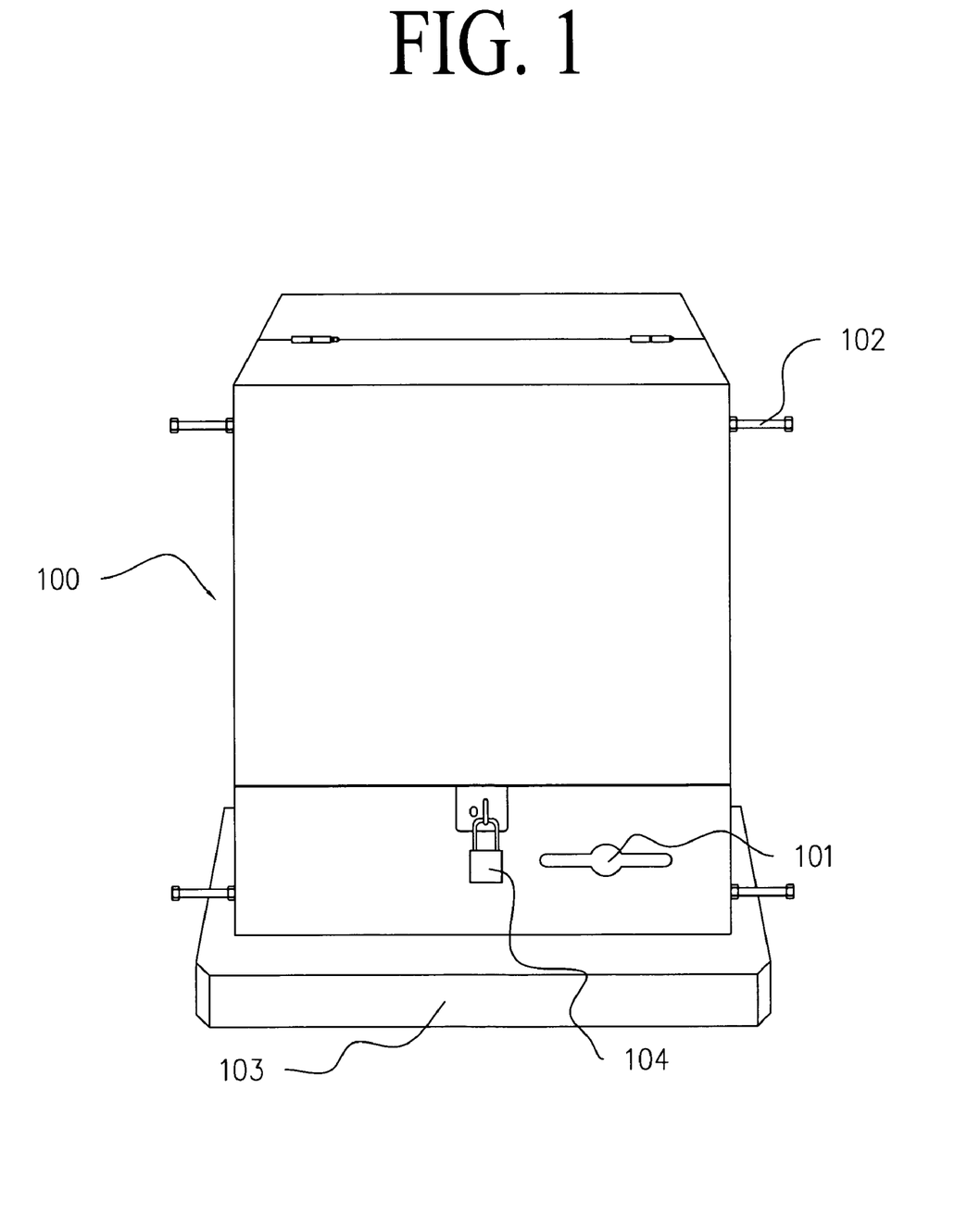
FIG. 1 is a perspective view of an exemplary embodiment of the present invention.

The present invention is a weatherproof and tamperproof power outlet enclosure useful for increasing the amount of electrical power available to an outdoor venue. The enclosure 100 shown in FIG. 1 is preferably made from hot rolled pickled and oiled (HRPO) steel, although the present invention should not be considered as limited exclusively thereto. The enclosure 100 is manufactured in a fully welded construction, and is shown in FIG. 1 positioned atop a concrete pad 103, although again the present invention should not be considered as limited exclusively thereto. An access door 105 is attached to the enclosure 100 via hinges.

Figure 2A:
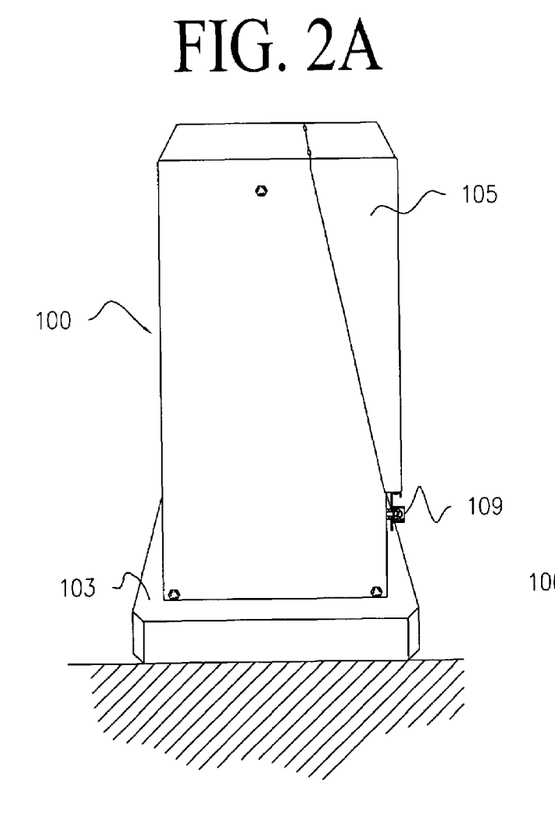
FIG. 2A is a side pad mount view of an exemplary embodiment of the present invention.
Figure 2B:
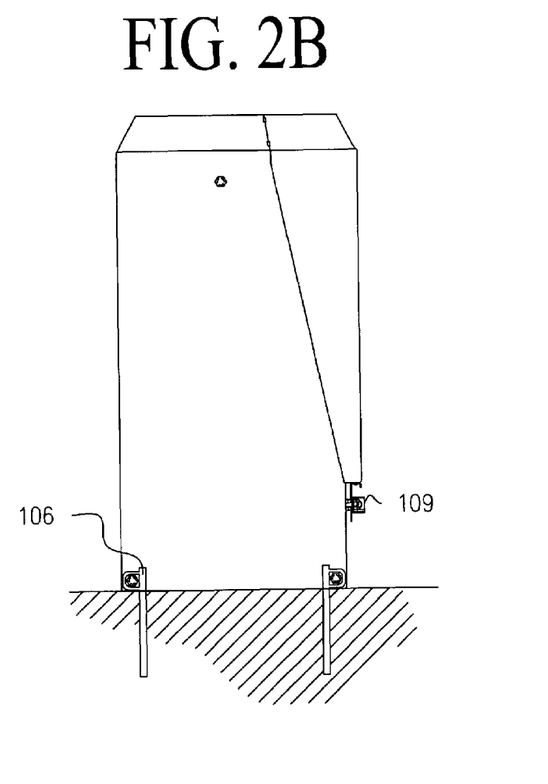
FIG. 2B is a side bare earthen ground mount view of an exemplary embodiment of the present invention.

As shown in FIG. 2A, the enclosure 100 can be mounted on a concrete pad 103 for stability and longevity, but as shown in FIG. 2B can also be mounted on bare earthen ground. When mounted on a concrete pad 103, the enclosure 100 can be secured to the pad 103 with, for example, four half-inch bolts in the bottom corners 112 (FIG. 3B) of the enclosure 100.

Conversely, when mounted on bare earthen ground, the enclosure 100 can be secured to the earth by, for example, four D-ring stakes 106 driven into the ground at the four corners of the exterior of the enclosure 100, as shown in FIG. 2B. These D-ring stakes can be secured to the enclosure 100 using, for example, four ⅝-11 bolts secured through the D-ring of the stake into four ⅝-11 hex nuts fully welded on each of the four corners of the enclosure.

Figure 3A:
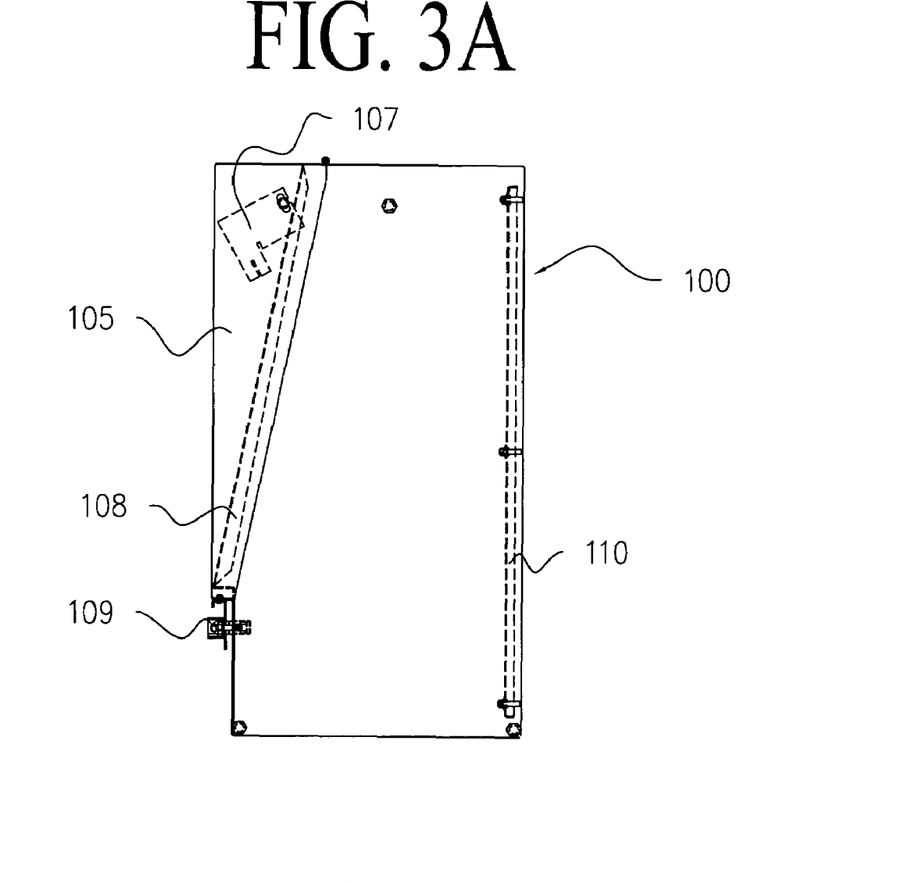
FIG. 3A is a view of the safety channels, wind stop, penta-head bolt system, and removable back panel of the present invention.

As shown in FIG. 3A, steel channels 108 welded or otherwise formed inside the access door 105 provide a layer of security to hamper unauthorized entry. The access door 105 of the enclosure 100 is removable and has a wind stop 107 which is used to secure the access door 105, thereby providing safety while in the open position. The present invention is totally weatherproof and can be locked while in use, due to the specially-shaped slot 101, which can pass electrical cords but does not otherwise permit entry. Numerous types of locking mechanisms can be used to secure the enclosure 100, including but not limited to a padlock 104 (as shown in FIG. 1), or a penta-head steel bolt 109 (as shown in FIGS. 2A, 2B, and 3A).

Figure 3B:
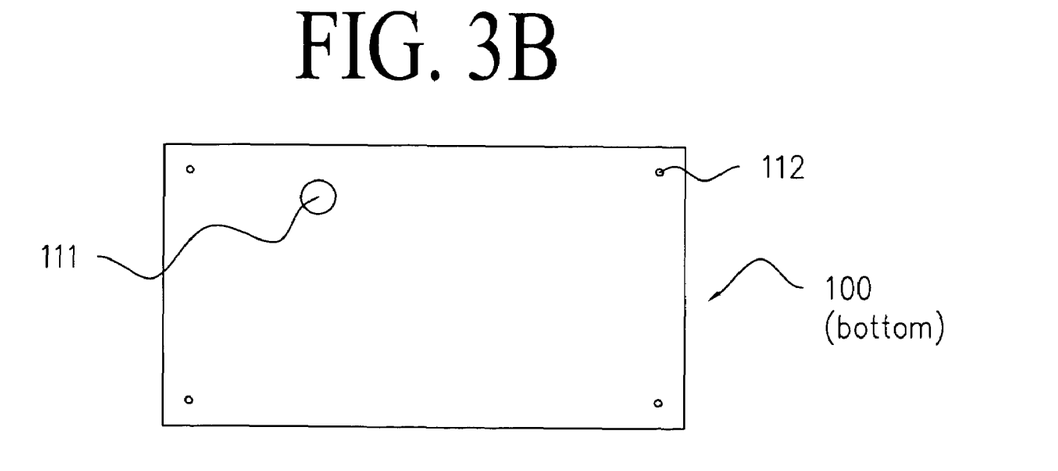
FIG. 3B is a bottom view of the present invention showing the various mounting holes.

FIG. 3B shows the bottom of the enclosure 100, with some detail omitted for simplicity. The aperture 111 is a hole in the bottom of the enclosure 100 in which conduit is placed allowing the wires feeding the breaker panel 113 to pass safely from the ground. The apertures 112 admit the bolts which attach the enclosure 100 to the concrete pad 103.

Some electrical enclosures only provide four power outlets. This can be a severe limitation at outdoor venues such as festivals and fairs, which may need access to numerous (e.g. >4) power outlets to supply power to various vendors and participants. Specifically, some types of vendor trailers, such as hot dog or funnel cake vendors, use 240 V receptacles. During a large event, it is desired to have a sufficient amount of such receptacles to accommodate numerous vendors with this requirement. However, safety is also paramount, so that breakers must be available in case of some type of electrical problem.

Figure 4:
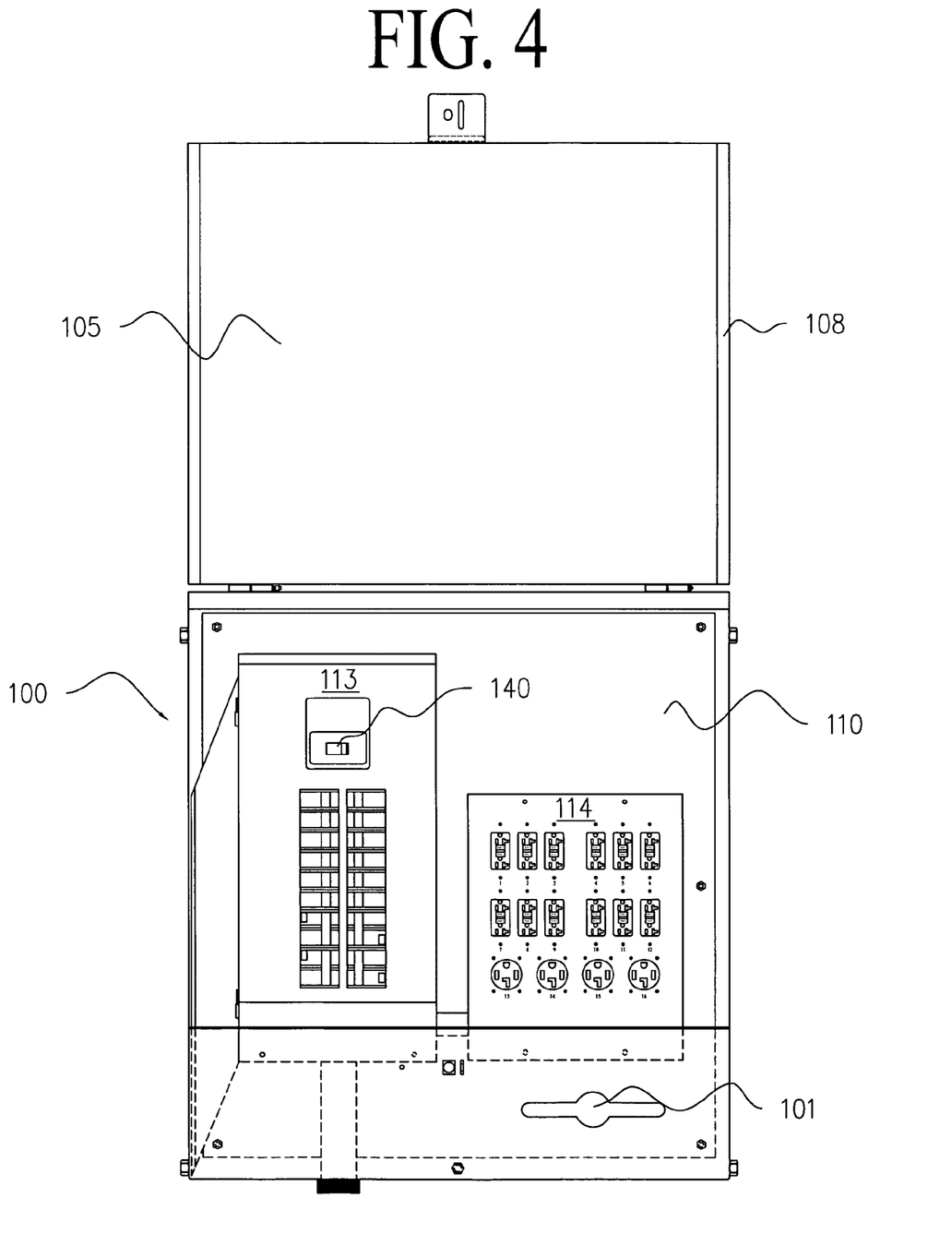
FIG. 4 is an overall view of an electrical panel and receptacle box of the present invention.

To address this, as shown in FIG. 4, the enclosure 100 of the present invention can be configured with up to one hundred 120 V dual receptacles, with two plugs per receptacle, as well as ten 240 V receptacles. This results in a total of 200 plugs total. All receptacles, regardless of voltage, have their own breaker, as shown within the breaker panel 113 in FIG. 4, and Ground Fault Circuit Interrupter (GFCI). Regarding the 120 V receptacles, the GFCI circuit is contained directly inside the receptacle. Regarding the 240 V receptacles, the GFCI circuit is contained within the breaker mechanism (inside breaker panel 113). Additionally, all embodiments of the present invention contain a master breaker 140.

The 240 V receptacles can come in a variety of shapes, so that the present invention is not limited to the specific implementation of 240 V receptacles shown in FIG. 4. Supposing some other type of receptacle that was not either round or rectangular was desired, the present invention has a modular construction which allows for a replaceable faceplate portion of the receptacle panel 114, which can be reconfigured to accommodate a variety of other receptacle shapes.

As shown in FIG. 4, the removable back panel 110 has a breaker panel 113 and a receptacle box 114 attached thereto. This back panel 110 can be, for example, configured to handle a 200 Amp load, although other load ratings are contemplated within the spirit and scope of the present invention. The receptacle box 114 is used to house multiple power outlet receptacles and can be made from HRPO steel, although the present invention should not be considered as limited exclusively thereto. The removable back panel 110 which is made from steel and is secured with, for example, six ⅜-16 hex nuts.

The removable back panel 110 allows for various components to be mounted and tested while being removed entirely from the enclosure 100. This removability gives an electrician an added level of convenience and safety when installing or doing maintenance on the enclosure 100, and is in keeping with the overall modular replaceable construction of the present invention. With the access door 105 off and the back panel out 110, a safe and easy installation and mounting of the enclosure 100 to earthen ground or a concrete pad can occur.

As shown in FIGS. 1 and 4, the bottom front of the enclosure 100 is provided with a specially shaped slot 101 for passage of electrical cords between the exterior and interior of the enclosure 100. This slot 101 front allows for the access door 105 to be closed and secured at all times, thereby allowing for safe weatherproof distribution of power to users. Also, as shown in FIGS. 1 and 4, the slot 101 has a round center aperture which is large enough to admit a typical round 240 V plug. When the access door 105 is closed, the enclosure 100 is secured and inaccessible to unauthorized entry, partly because of a built in stainless steel bolt such as penta-head bolt 109, or alternatively an exterior padlock 104. This is advantageous because penta-head bolts require a specialized penta-head wrench, which is not available to the general public. Accordingly, the use of this unusual size adds a safety and security benefit to the present invention.

The enclosure 100 meets ANSI C57.12.28-1988 standard for structural integrity and paint finish. The enclosure 100 also meets ANSI standards for being tamperproof, and also for its finish characteristics. Although not shown within the concrete pad 103 of FIG. 1, the enclosure 100 can also be equipped with bollards or barricades to prevent or at least deter collisions with automobiles. These can be made of concrete, or of some other durable material.

Figure 5:
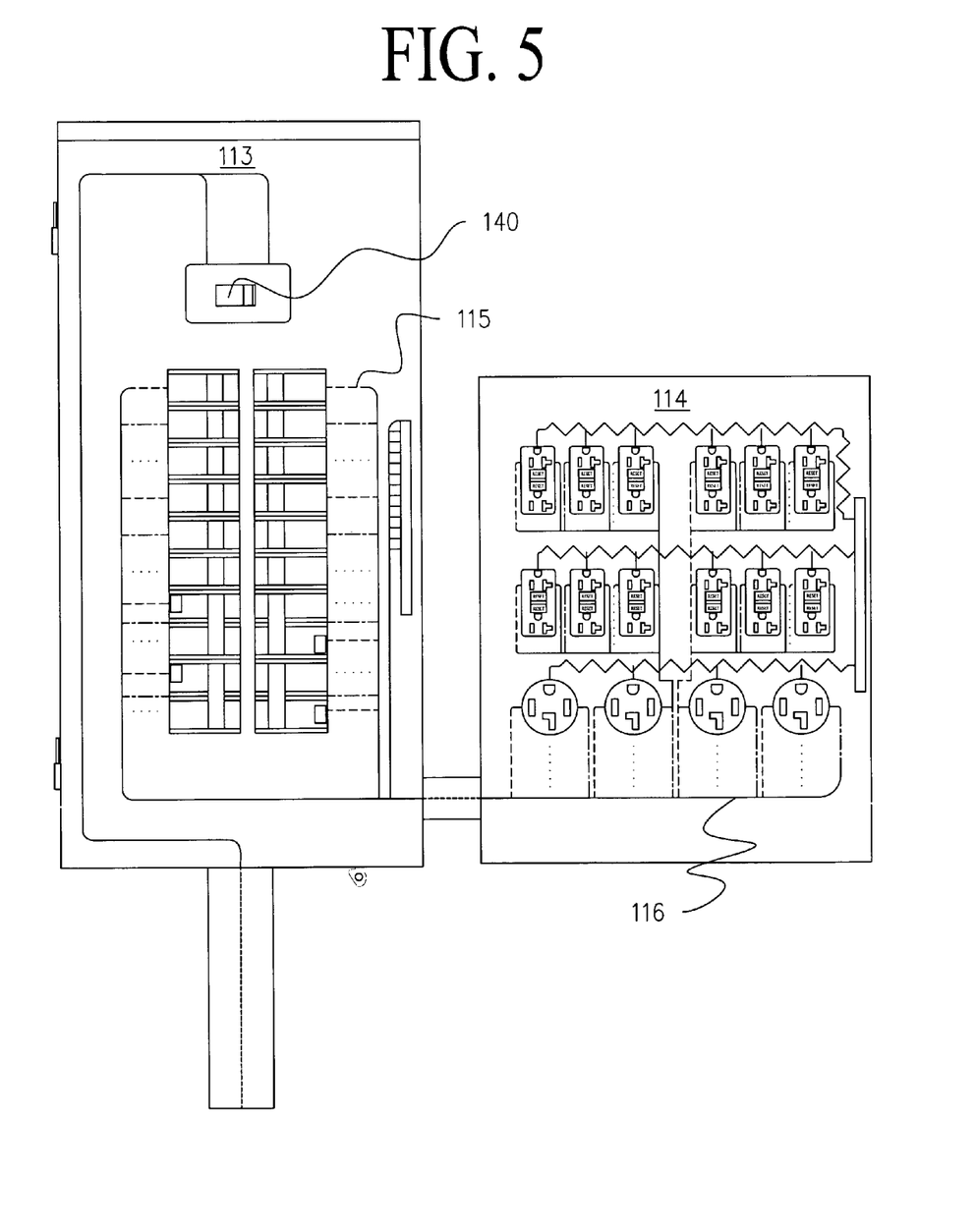
FIG. 5 is the wiring detail of the back panel and receptacle box of FIG. 4.

Within the enclosure 100, all interior wiring, otherwise hidden from view, is color coded and well organized. FIG. 5 is a generalized schematic of the wiring detail. Because patent drawings do not permit color designations, this color coding is symbolized by different styles of horizontal lines (e.g. ----; -.-.-.; . . . . , etc). Each individual circuit has a different color wire for the hot (highest potential, carrying power from utility company) lead. This color coding allows for a safe and clear working environment for anyone who might be working on the enclosure 100. Conventional electrical enclosures use the same color wiring for the hot leads to save on money and time of assembly, which increases risk of shock for a repair-person who is unfamiliar with such a conventional enclosure.

Similarly, as shown on the RH side of FIG. 5, both the electrical panel wiring 115 and the receptacle box wiring 116 are color coded. Using this color-coding, a worker repairing the breaker panel 113 can quickly determine by sight which receptacles within the receptacle panel 114 are connected to which breakers.

Also as shown in FIG. 5, all wiring is meticulously placed, routed, and segregated, so as to provide a clear concise roadmap to anyone performing maintenance on the enclosure 100. Conventional enclosures may gang or cluster all the wires together, where all wires are all the same color. Although this segregation and careful routing makes the enclosure 100 take slightly longer to assemble, there exists a much larger benefit of reduced repair costs, increased safety, and clarity of usage.

Figure 6A:
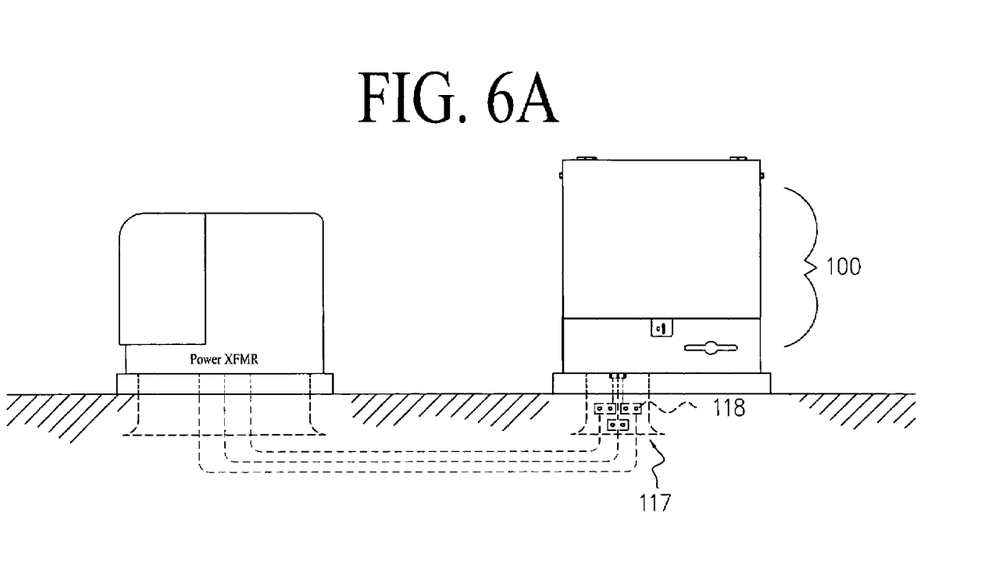
FIG. 6A is a view of the supply wiring for the present invention.
Figure 6B:
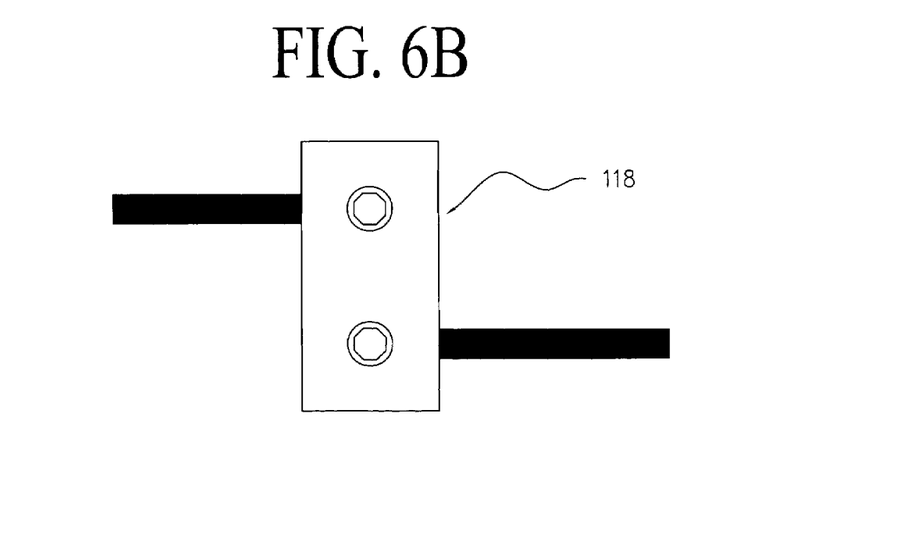
FIG. 6B is a detail view of an optional detachable connector used within the configuration of FIG. 6A.

As shown in FIG. 6A, the enclosure 100 can be equipped with detachable connectors 118, so as to reduce safety hazard in the event of an automobile collision. The connectors 118, also known as bus-bars, are arranged in such a way that they are not affected by typical wiring stresses, but could only be torn loose in the event of severe trauma to the enclosure 100. In such a case, if these connectors 118 are torn loose, the enclosure 100 becomes electrically inert. This is because the tensile strength of the wire is greater than the mechanical gripping strength of the bus-bar 118 upon that wire. Thus, if the enclosure 100 is impacted, such as by an automobile, the hot electrical wire will prefer to tear loose from the bus-bar 118, rather than stay electrically connected. This is an advantage both for safety, as no hot leads are lurking about, as well as repair, as the connection from the transformer to the bus-bar will probably remain intact. Thus, the only repair needed will be from the bus-bar to the enclosure 100, which is much simpler.

To accommodate the potential increased electrical power demand of the present invention, it may be helpful to make adjustments to the power transformer provided by a local power company utility, such as that shown in FIG. 6A. It may also be necessary to make adjustments to the thickness of wiring connecting this transformer to the present invention.

To aid in the installation process, some number of bolts are welded onto the exterior of the enclosure 100 and powder coated. A suggested number of bolts could be six, although the present invention should not be considered as limited exclusively thereto. Carrying handles can be added by placing bolts 102 into four of the six bolt holes. This allows a quick and easy means for the installer to carry the enclosure to the desired location during installation. The handles can also be used as a point of attachment by equipment to hoist the enclosure 100 into place. The handles also allow for quick and easy means for removal of the enclosure, such as during some type of flood-water emergency.

Once the enclosure 100 is in place, the bolts 101 can be removed. The installation bolts 101 are removable as to not take away from the overall look of the enclosure 100, but to provide a convenient means to carry and transport the enclosure.

Figure 7:
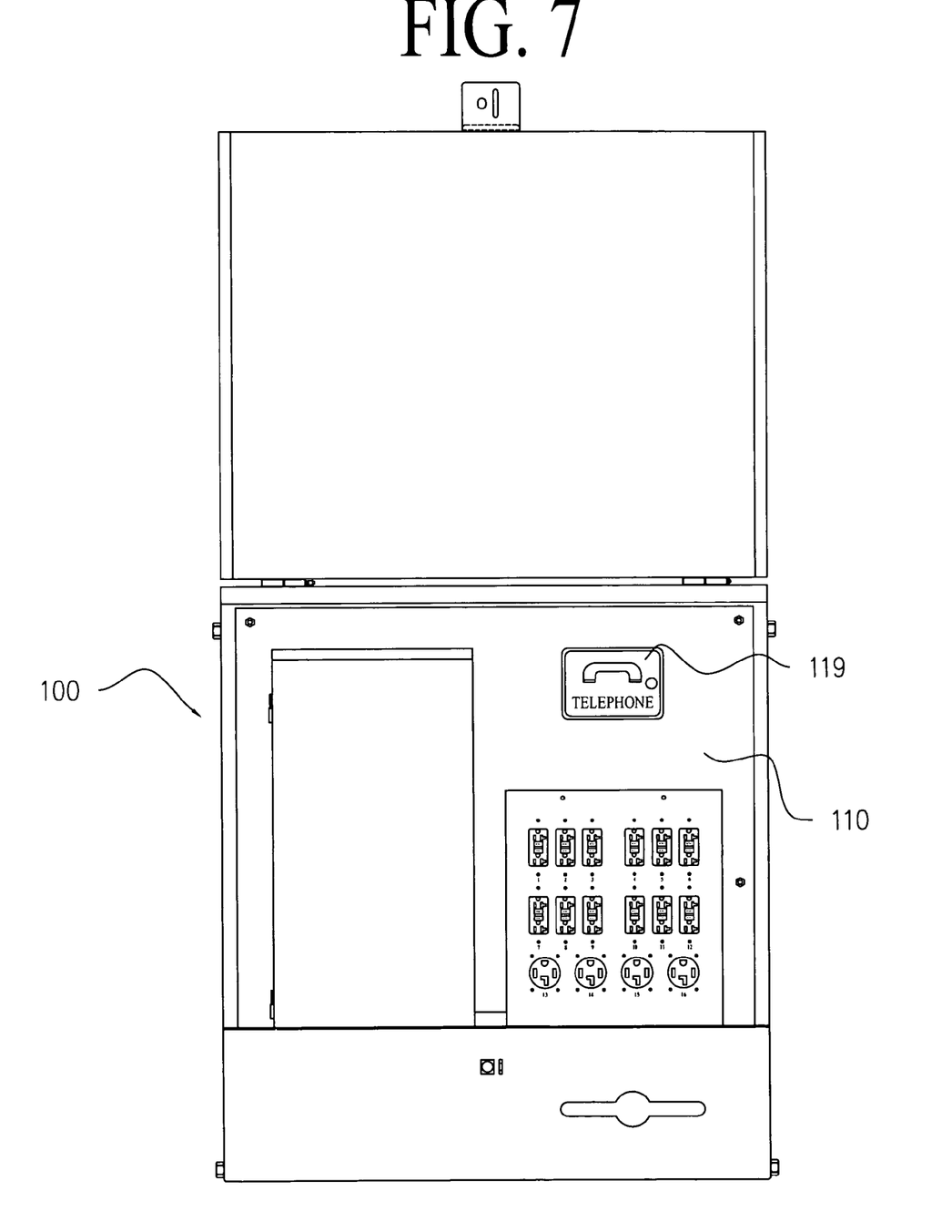
FIG. 7 is a view of a telephone modification to the present invention.

Other modifications to the present invention could include adding a land-line telephone connection 119 (FIG. 7), as well as other types of connections such as parking lot lights. In an alternate embodiment, the enclosure 100 can also be manufactured to accommodate 3-phase power devices, and also accommodate non-standard voltages, such as, but not limited, to 400V.

The enclosure 100 of the present invention is modular in design. Every component of the enclosure 100 is interchangeable for convenience and longevity. No single component of the enclosure 100 depends on any other component to function. Each and every component of the enclosure 100 can be changed out and/or replaced without affecting the other components. This is extremely valuable when performing maintenance and/or replacing components within the enclosure 100.

Additionally, the enclosure 100 is manufactured so that all of the interior components are readily available and can be bought at any hardware store. This gives the user the flexibility to do their own maintenance without relying on the manufacturer. This modularity exists with every aspect of the invention. If a car hits the enclosure 100 and destroys it, in less than 30 minutes a new replacement can be installed and functioning. Conversely, if a conventional power enclosure was hit by a car, it could potentially take days to replace because of their non-modular design.

It is anticipated that various changes may be made in the arrangement and operation of the system of the present invention without departing from the spirit and scope of the invention, as defined by the following claims.

What is claimed is:

1. An electrical enclosure, comprising:
an welded steel frame containing both an breaker panel and a receptacle box electrically connected together;
said receptacle box containing a plurality of receptacles of a first voltage, and a plurality of receptacles of a second voltage;
said breaker panel being electrically located between said receptacle box and a power company's utility transformer, and containing a unique breaker for each receptacle;
an access door attached to said frame via hinges, for securely covering said breaker panel and said receptacle box; and
an aperture within said lid, for safely admitting electrical cords so that said enclosure can supply electrical power regardless of weather conditions.

2. The enclosure of claim 1, wherein said receptacles of a first voltage are 120 V receptacles, each containing two electrical plugs, and said receptacles of a second voltage are 240 V receptacles.

3. The enclosure of claim 1, wherein:
wherein said enclosure is located outdoors and is used for supplying power to outdoor events.

4. The enclosure of claim 1, wherein:
wherein said access door is secured to frame enclosure via a pentahead bolt.

5. The enclosure of claim 1, wherein:
wherein said access door is secured to frame enclosure via a padlock.

6. The enclosure of claim 1, wherein:
wherein all steel used within said enclosure is hot rolled pickled and oiled steel.

7. The enclosure of claim 1, wherein:
wherein said access door has safety features embedded therein.

8. The enclosure of claim 7, wherein:
wherein said access door's safety features include channels welded therein.

9. The enclosure of claim 1, wherein:
said enclosure being secured to a concrete pad by bolts positioned in the bottom corners of said enclosure.

10. The enclosure of claim 1, wherein:
said enclosure being mounted on bare earthen ground.

11. The enclosure of claim 10, wherein:
said enclosure being secured to the earthen ground by a plurality of D-ring stakes driven into the ground at the corners of the exterior of said enclosure.

12. The enclosure of claim 11, further comprising:
a plurality of bolts secured through said D-ring stakes into hex nuts fully welded on each of the corners of said enclosure.

13. The enclosure of claim 1, wherein:
said access door is removable and has a wind stop which is used to secure it.

14. The enclosure of claim 1:
wherein all receptacles have their own breaker and ground fault circuit interrupter.

15. The enclosure of claim 2, further comprising:
a ground fault circuit interrupter is contained directly inside each 120V receptacle, and
a ground fault circuit interrupter is contained within the breaker mechanism for the 240V receptacle.

16. The enclosure of claim 1, wherein:
said breaker panel contains a master breaker.

17. The enclosure of claim 1, wherein:
said receptacle panel has a replaceable faceplate portion.

18. The enclosure of claim 1, wherein:
said enclosure is rated at 200 Amps.

19. The enclosure of claim 1, wherein:
within said breaker panel, each individual circuit has a different color wire for a hot lead.

20. The enclosure of claim 19:
wherein all wiring within said breaker panel is segregated and carefully routed.

21. The enclosure of claim 1, further comprising:
detachable connectors, located underneath said enclosure and electrically between said breaker panel and said utility company transformer.

22. The enclosure of claim 1, further comprising:
a plurality of bolts are welded onto the exterior of said enclosure and powder coated.

23. The enclosure of claim 22:
wherein the number of said plurality of bolts is six.

24. The enclosure of claim 23, further comprising:
a plurality of carrying handles, wherein said handles are installed by placing bolts into four of a plurality of holes created for said bolts.

25. The enclosure of claim 24:
wherein said handles can also be used as a point of attachment by equipment to hoist the enclosure into a desired location.

26. The enclosure of claim 1, further comprising:
a land-line telephone connection, located within said enclosure and wired to a telephone system using underground means.

27. The enclosure of claim 1, further comprising:
a plurality of connections for parking lot lights, connected to said breaker box and also to said lights using underground means.

28. The enclosure of claim 1, further comprising:
wherein no single component within said enclosure depends on any other component to function.

29. The enclosure of claim 1:
wherein all components of the enclosure can be changed out and/or replaced without affecting the other components.

30. A method of installing an electrical enclosure, comprising:
welding a steel frame together;
locating a breaker panel and receptacle box within said frame;
wiring said breaker panel and receptacle box to be color-coded;
electrically connecting said enclosure to a power transformer provided by a local power company utility; and
mechanically connecting said enclosure to a mounting surface.

31. The method of claim 30, further comprising:
locating detachable connectors between said enclosure and said power transformer.

32. The method of claim 30, further comprising:
securing an access door to said frame via hinges and a pentahead bolt.

33. The method of claim 30, further comprising:
securing an access door to said frame via hinges and a padlock.

34. The method of claim 30, further comprising:
manufacturing all steel used within said enclosure to be hot rolled pickled and oiled steel.

35. The method of claim 33, further comprising:
welding steel channels within said access door.

36. The method of claim 34, further comprising:
welding steel channels within said access door.

37. The method of claim 30, further comprising:
securing said enclosure to a concrete pad by bolts positioned in the bottom corners of said enclosure.

38. The method of claim 30, further comprising:
mounting said enclosure on bare earthen ground.

39. The method of claim 38, further comprising:
securing said enclosure to the earthen ground by a plurality of D-ring stakes driven into the ground at the corners of the exterior of said enclosure.

40. The method of claim 30, further comprising:
providing all receptacles with their own breaker and ground fault circuit interrupter.

41. The method of claim 30, further comprising:
designating a different color wire for the hot lead for each individual circuit within said breaker panel.

42. The method of claim 30, further comprising:
segregating and carefully routing all wiring within said breaker panel.

43. The method of claim 30, further comprising:
locating detachable connectors underneath said enclosure and electrically between said breaker panel and said utility company transformer.

* * * * *